United States Patent
Kludt et al.

(10) Patent No.: US 9,048,913 B2
(45) Date of Patent: Jun. 2, 2015

(54) METHOD AND APPARATUS FOR ADAPTIVE CONTROL OF TRANSMIT DIVERSITY TO PROVIDE OPERATING POWER REDUCTION

(75) Inventors: Kenneth Kludt, Bedminster, NJ (US); Haim Harel, New York, NY (US); Sherwin J. Wang, Towaco, NJ (US)

(73) Assignee: GOOGLE INC., Mountain View, CA (US)

( * ) Notice: Subject to any disclaimer, the term of this patent is extended or adjusted under 35 U.S.C. 154(b) by 467 days.

(21) Appl. No.: 13/177,524

(22) Filed: Jul. 6, 2011

(65) Prior Publication Data

US 2012/0009968 A1    Jan. 12, 2012

Related U.S. Application Data

(60) Provisional application No. 61/361,631, filed on Jul. 6, 2010.

(51) Int. Cl.
*H04W 52/00* (2009.01)
*H04B 7/06* (2006.01)

(52) U.S. Cl.
CPC ............ *H04B 7/0693* (2013.01); *H04B 7/0689* (2013.01)

(58) Field of Classification Search
CPC .............................. H04W 52/24; H04W 52/50
USPC ................... 455/101, 115.1, 67.11, 102, 66.1
See application file for complete search history.

(56) References Cited

U.S. PATENT DOCUMENTS

| | | | |
|---|---|---|---|
| 4,057,758 A * | 11/1977 | Hattori et al. | 375/267 |
| 5,621,723 A * | 4/1997 | Walton et al. | 370/335 |
| 5,642,353 A | 6/1997 | Roy, III et al. | |
| 5,701,595 A * | 12/1997 | Green, Jr. | 455/83 |
| 5,832,044 A | 11/1998 | Sousa et al. | |
| 5,940,743 A * | 8/1999 | Sunay et al. | 455/69 |
| 5,960,330 A * | 9/1999 | Azuma | 455/70 |
| 5,991,330 A | 11/1999 | Dahlman et al. | |
| 5,999,826 A | 12/1999 | Whinnett | |
| 6,002,558 A * | 12/1999 | Rines et al. | 360/137 |
| 6,016,123 A * | 1/2000 | Barton et al. | 342/373 |
| 6,185,440 B1 | 2/2001 | Barratt et al. | |
| 6,186,602 B1 * | 2/2001 | Jonner et al. | 303/115.4 |
| 6,226,509 B1 | 5/2001 | Mole et al. | |
| 6,236,363 B1 | 5/2001 | Robbins et al. | |
| 6,330,294 B1 | 12/2001 | Ansbro et al. | |

(Continued)

FOREIGN PATENT DOCUMENTS

| | | |
|---|---|---|
| EP | 0 986 193 | 3/2000 |
| EP | 1 282 242 | 2/2003 |

(Continued)

OTHER PUBLICATIONS

Derryberry et al., "Transmit Diversity in 3G CDMA Systems", Wideband Wireless Access Technologies to Broadband Internet, IEEE Communications Magazine, Apr. 2002, pp. 68-75.

(Continued)

*Primary Examiner* — Hai V Nguyen

(74) *Attorney, Agent, or Firm* — Gottlieb, Rackman & Reisman, PC

(57) ABSTRACT

A method and apparatus for selectively enabling or disabling transmit diversity in a mobile communication device. The mobile communication device may switch between diversity and non-diversity operation based on various transmit power considerations.

30 Claims, 7 Drawing Sheets

(56) References Cited

U.S. PATENT DOCUMENTS

| | | | |
|---|---|---|---|
| 6,343,218 B1 | 1/2002 | Kaneda et al. | |
| 6,392,988 B1 | 5/2002 | Allpress et al. | |
| 6,473,600 B1* | 10/2002 | Dvorkin | 455/129 |
| 6,492,942 B1 | 12/2002 | Kezys | |
| 6,498,785 B1* | 12/2002 | Derryberry et al. | 370/311 |
| 6,636,495 B1 | 10/2003 | Tangemann | |
| 6,661,999 B1* | 12/2003 | Johnson et al. | 455/127.1 |
| 6,690,665 B1* | 2/2004 | Choi et al. | 370/376 |
| 6,704,370 B1 | 3/2004 | Chheda et al. | |
| 6,731,198 B1* | 5/2004 | Stobbe et al. | 340/10.33 |
| 6,745,009 B2 | 6/2004 | Raghothaman | |
| 6,754,473 B1 | 6/2004 | Choi et al. | |
| 6,754,497 B1* | 6/2004 | Ozluturk | 455/437 |
| 6,810,264 B1 | 10/2004 | Park et al. | |
| 6,859,643 B1 | 2/2005 | Ma et al. | |
| 6,882,228 B2 | 4/2005 | Rofougaran | |
| 7,107,021 B2* | 9/2006 | Kim et al. | 455/101 |
| 7,236,539 B2* | 6/2007 | Deng et al. | 375/267 |
| 7,248,841 B2* | 7/2007 | Agee et al. | 455/101 |
| 7,359,343 B2* | 4/2008 | Goodings | 370/311 |
| 7,386,308 B2* | 6/2008 | Mann | 455/426.1 |
| 7,433,334 B2* | 10/2008 | Marjelund et al. | 370/334 |
| 7,505,790 B2* | 3/2009 | Chang et al. | 455/562.1 |
| 7,542,733 B1* | 6/2009 | Ngan | 455/101 |
| 7,660,598 B2 | 2/2010 | Barnett et al. | |
| 7,729,714 B2 | 6/2010 | Black et al. | |
| 7,876,259 B2* | 1/2011 | Schuchman | 342/37 |
| 8,018,983 B2* | 9/2011 | Tornatta et al. | 375/136 |
| 8,134,980 B2* | 3/2012 | Proctor, Jr. | 370/335 |
| 8,310,401 B2* | 11/2012 | Qi et al. | 343/702 |
| 8,385,294 B2* | 2/2013 | Ben-Eli | 370/334 |
| 8,442,058 B2* | 5/2013 | Kelly et al. | 370/395.5 |
| 8,532,595 B1* | 9/2013 | Khlat et al. | 455/127.1 |
| 8,630,595 B2* | 1/2014 | Karmi et al. | 455/101 |
| 8,634,782 B2* | 1/2014 | Asuri et al. | 455/101 |
| 8,670,726 B2* | 3/2014 | Poulin | 455/78 |
| 8,676,149 B2* | 3/2014 | Beamish | 455/343.1 |
| 8,772,641 B2* | 7/2014 | Badura et al. | 174/135 |
| 8,792,932 B2* | 7/2014 | Wang et al. | 455/522 |
| 2001/0024964 A1* | 9/2001 | Wang et al. | 455/562 |
| 2002/0183086 A1* | 12/2002 | Hellmark et al. | 455/522 |
| 2003/0013476 A1* | 1/2003 | Park et al. | 455/522 |
| 2003/0112880 A1 | 6/2003 | Walton et al. | |
| 2004/0048584 A1 | 3/2004 | Vaidyanathan et al. | |
| 2004/0085239 A1 | 5/2004 | Ukena et al. | |
| 2004/0253955 A1* | 12/2004 | Love et al. | 455/442 |
| 2005/0059355 A1 | 3/2005 | Liu | |
| 2005/0118993 A1* | 6/2005 | Roux et al. | 455/423 |
| 2005/0143113 A1 | 6/2005 | Lee et al. | |
| 2006/0009168 A1* | 1/2006 | Khan et al. | 455/101 |
| 2006/0121928 A1* | 6/2006 | Itsuki | 455/522 |
| 2006/0135079 A1* | 6/2006 | Barnett et al. | 455/69 |
| 2007/0218849 A1* | 9/2007 | Harel et al. | 455/127.3 |
| 2008/0102873 A1* | 5/2008 | Kumar | 455/522 |
| 2008/0132265 A1* | 6/2008 | Tudosoiu | 455/522 |
| 2008/0151798 A1* | 6/2008 | Camp | 370/311 |
| 2009/0047998 A1* | 2/2009 | Alberth, Jr. | 455/562.1 |
| 2010/0173666 A1* | 7/2010 | Kawagishi et al. | 455/522 |
| 2010/0234060 A1* | 9/2010 | Beamish | 455/522 |
| 2011/0019715 A1* | 1/2011 | Brisebois | 375/130 |
| 2011/0081875 A1* | 4/2011 | Imamura et al. | 455/101 |
| 2011/0081934 A1* | 4/2011 | Imamura et al. | 455/522 |
| 2011/0085197 A1* | 4/2011 | Kim | 358/1.15 |
| 2011/0092241 A1* | 4/2011 | Kawai et al. | 455/509 |
| 2012/0002602 A1* | 1/2012 | Hamaguchi et al. | 370/328 |
| 2012/0202555 A1* | 8/2012 | Bergman et al. | 455/522 |

FOREIGN PATENT DOCUMENTS

| | | |
|---|---|---|
| EP | 1 282 244 | 2/2003 |
| EP | 1 284 545 | 2/2003 |
| EP | 1 262 031 | 5/2004 |
| GB | 2 353 437 | 2/2001 |
| JP | 09-238098 | 9/1997 |
| JP | 2000-151484 | 5/2000 |
| WO | WO 97/24818 | 7/1997 |
| WO | WO 00/79701 | 12/2000 |
| WO | WO 01/69814 | 9/2001 |
| WO | WO 03/090386 | 10/2003 |
| WO | WO 2004/045108 | 5/2004 |
| WO | WO 2005/081444 | 9/2005 |

OTHER PUBLICATIONS

Rashid-Farrokhi, et al., "Transmit Beamforming and Power Control for Cellular Wireless Systems", IEEE Journal on Selected Areas in Communications, vol. 16, No. 8, Oct. 1998, pp. 1437-1450.

* cited by examiner

METHOD AND APPARATUS FOR ADAPTIVE CONTROL OF TRANSMIT DIVERSITY TO PROVIDE OPERATING POWER REDUCTION

CROSS-REFERENCE TO RELATED APPLICATIONS

This application claims benefit of U.S. Provisional Patent Application Ser. No. 61/361,631, entitled "Method and Apparatus for Adaptive Control of Transmit Diversity to Provide Operating Power Reduction" filed Jul. 6, 2010, the entirety of which is incorporated by reference herein.

FIELD OF THE INVENTION

This invention relates generally to the field of mobile wireless communications and more specifically to controlling transmit power of a mobile transmit diversity communications device.

BACKGROUND OF THE INVENTION

A transmit diversity communication device is one having a plurality of transmit paths that simultaneously transmit respective transmit signals that differ by a transmit diversity signal, for example, a relative phase, relative amplitude, or relative power. One goal of mobile transmit diversity is to obtain constructive interference, also known as beamforming, of the transmit signals at the receiver, e.g., a base station.

In transmit diversity systems, one possible advantageous feature is an extension of operating range. This effect may be an outcome of forming a beam using the plurality of transmit paths that exhibits a higher Effective Radiated Power (ERP) at the base station than a conventional (non-diversity) transmitter transmitting using a single transmit path. Transmit beamforming can be performed by using feedback information from the receiver to the transmit diversity transmitter in adjusting the value of the transmit diversity parameter.

Generally, in communication systems between a mobile handset, for example, a mobile telephone, personal digital assistant (PDA), laptop computer, etc. and a base station, there is typically a protocol for mobile communication with the base station.

As described in prior patent applications of the assignee of the present invention, a mobile transmit diversity (MTD) device may use two antennas simultaneously transmitting with a transmit diversity parameter, for example, a phase difference or a power ratio between at least two antennas. In one embodiment, two power amplifiers may be used to amplify the respective transmit signals, thereby potentially providing a current (i.e., power) saving by the mobile device, as described, for example, in U.S. Pat. Pub. No. 2007/0218849, the entire contents of which are incorporated herein by reference. Use of mobile transmit diversity may permit extending the effective range of a mobile device from a base station using the same (or less) power as a non-diversity transmission device.

As described therein, the transmitter chains may include a power amplifier (PA), a phase modulator (PM) and an antenna. When configured to provide beam forming MTD, the relative phase between the two paths may be adjusted such that the signals arrive at the base station antenna in-phase to constructively add. In this case the performance is higher than achieved with just the sum of the two powers combined. The difference is diversity gain (Gd).

Because a mobile transmit diversity device may obtain a diversity gain at the receiver using feedback to provide beamforming, current consumption efficiency gains may be produced. For example, a suitable receive power may be obtained by operating one or more of the amplifiers at less than half the specification power of the device. Accordingly, one or both of the amplifiers may be operated to provide maximum efficiency at a fraction, e.g., half or even a quarter, of the specification power of the device.

SUMMARY OF EMBODIMENTS OF THE INVENTION

Embodiments of the invention include mobile wireless communication devices and methods of their use, comprising: receiving an input signal for transmission; determining whether to transmit the input signal in diversity or non-diversity mode; if the determination is to transmit the signal in diversity mode, then: producing first and second transmit signals, said first and second transmit signals differing by a transmit diversity parameter, and simultaneously transmitting the first and second transmit signals using first and second transmit paths, respectively; and if the determination is to transmit the signal in non-diversity mode, then: transmitting the input signal using only a selected one of said first and second transmit paths.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
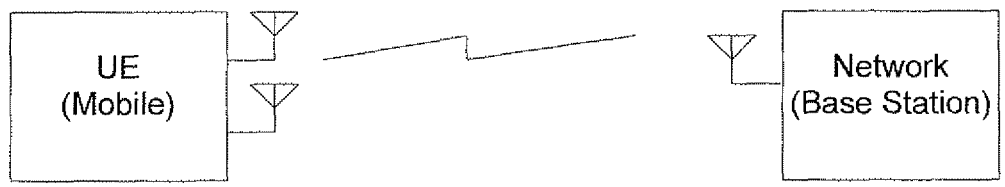
FIG. 1 is a schematic diagram of a system according to an embodiment of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF EMBODIMENTS OF THE INVENTION

Embodiments of the invention may be used in communication systems in connection with mobile transmit diversity devices. A communication system may include a mobile transmitter, also referred to as a modifying communication device, that adjusts a nominal value of a transmit diversity parameter, for example, a phase difference and/or a power ratio between a signal transmitted on a first antenna and a second antenna. Although the embodiments described in the present application are described as using two antennas, it will be recognized that the present invention is equally applicable to transmit diversity systems and devices having more than two antennas.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed simultaneously, at the same point in time, or concurrently.

The present invention may be applicable in any communication network between a mobile device and a second communication device, including but not limited to a base station. Networks may utilize communication protocols and technologies to provide the communication sessions. Examples of communication protocols and technologies include those set by the Institute of Electrical and Electronics Engineers, Inc. (IEEE) 802.xx standards, International Telecommunications Union (ITU-T) standards, European Telecommunications Standards Institute (ETSI) standards, Internet Engineering Task Force (IETF) standards, or other standards.

Communication devices in a network may use any suitable multiple access technology, for example, a code division multiple access (CDMA) technology. According to one embodiment, the network may operate according to a CDMA 2000 telecommunications technology that uses a single CDMA channel. As an example, a CDMA 2000 high rate data packet technology, such as the Evolution Data Optimized (EvDO) technology may be used.

The network may comprise any suitable communication network. A communication network may comprise all or a portion of a public switched telephone network (PSTN), a public or private data network, a local area network (LAN), a metropolitan area network (MAN), a wide area network (WAN), a global computer network such as the Internet, a wireless network, a local, regional, or global communication network, an enterprise intranet, other suitable communication link, or any combination of the preceding.

A component of a network, for example, a mobile communication device, may include logic, an interface, memory, other component, or any suitable combination of the preceding. "Logic" may refer to hardware, software, other logic, or any suitable combination of the preceding. Certain logic may manage the operation of a device, and may comprise, for example, a processor. "Interface" may refer to logic of a device operable to receive input for the device, send output from the device, perform suitable processing of the input or output or both, or any combination of the preceding, and may comprise one or more ports, conversion software, or both. "Memory" may refer to logic operable to store and facilitate retrieval of information, and may comprise a Random Access Memory (RAM), a Read Only Memory (ROM), a magnetic drive, a disk drive, a Compact Disk (CD) drive, a Digital Video Disk (DVD) drive, a removable media storage, any other suitable data storage medium, or a combination of any of the preceding.

The communication network may include one or more mobile or modifying communication devices and one or more other communication devices, for example base stations that communicate via a wireless link. A mobile communication device unit may comprise any device operable to communicate with a base station, for example, a personal digital assistant (PDA), a cellular telephone, a mobile handset, a laptop computer, or any other device suitable for communicating signals to and from a base station. A subscriber unit may support, for example, Session Initiation Protocol (SIP), Internet Protocol (IP), or any other suitable communication protocol.

A base station may provide a subscriber unit access to a communication network that allows the subscriber unit to communicate with other networks or devices. A base station typically includes a base transceiver station and a base station controller. The base transceiver station communicates signals to and from one or more subscriber units. The base station controller manages the operation of the base transceiver station.

According to embodiments of the invention, the mobile communication device may include two or more antenna elements, where each antenna element is operable to receive, transmit, or both receive and transmit a signal. Multiple antenna elements may provide for a separation process known as spatial filtering, which may enhance spectral efficiency, allowing for more users to be served simultaneously over a given frequency band.

As described more fully below, according to embodiments of the present invention, the mobile communication device may include a processor and a transmit/receive module that calculate and produce one or more signals for transmission over at least first and second antennas.

According to one embodiment, modifying a signal may refer to modifying a signal feature. For example, a signal may be transmitted by the two antennas using a modified signal feature, or a different value of a transmit diversity parameter. A transmission signal feature, or in some embodiments of the invention, a transmit diversity parameter, may refer without limitation to any feature of the transmission, for example, relative phase, relative amplitude, relative power, absolute power, frequency, timing, other suitable signal feature that may be modulated, or any combination of the preceding. Relative phase may refer to the phase difference between the phase of a first signal of a first transmit antenna element and the phase of a second signal of a second transmit antenna element. Relative power may refer to the ratio between the power of a first signal of a first transmit antenna element and the power of a second signal of a second transmit antenna element, which ratio may be defined on a linear or logarithmic scale. Relative amplitude may refer to the ratio between the amplitude of a first signal of a first transmit antenna element and the amplitude of a second signal of a second transmit antenna element. Absolute power may refer to the total power transmitted by all antennas of modifying communication device. According to one embodiment, modifying a signal may be described as adjusting a nominal value of a transmit diversity parameter.

According to embodiments of the invention, a diversity parameter may be a parameter distinguishing between the transmission on any two antennas, for example a difference in transmission phase on the two antennas, or a ratio of transmission power on the two antennas. It will be understood that although examples are provided in the present application pertaining to phase difference between two antennas, the invention is applicable using the same principles to varying any transmit diversity parameter.

Mobile user equipment devices (UEs) using beam forming transmit diversity (MTD) may typically use two transmit chains each including, but not limited to a phase modulator (PM), power amplifier (PA) and primary and secondary antennas.

In a typical operation, the base station may adjust the transmitted power of the UE with a transmit power control (TPC) feedback command so as to limit the transmitted power to be no higher than necessary, or so as to increase the transmitted power to overcome fading.

The transmit diversity parameter may be modified in order to provide beamforming at the base station. In one implementation of MTD, the UE may employ an algorithm using the TPC to adjust the relative phase between the transmitted signals and observe the effect on the power command received by the UE. The phase adjusting algorithm may assume the phase setting that produces a "power down" command is at a more nearly optimum constructive phase than a phase setting that produces a "power up" command. This cause and effect process is constantly adjusting the relative phase to maintain the signals' relationship in spite of changing geometry of the UE with respect to the base station and through varying propagation conditions. In another implementation of MTD, the base station may expressly instruct the UE how to modify the phase difference so as to improve reception.

It will be understood that embodiments of the invention may be used in connection with any type of transmit diversity feedback, including without limitation, "open-loop" feedback, which uses a feedback parameter not dedicated to transmit diversity such as a TPC signal for adjusting the transmit diversity parameter, or "closed-loop" feedback, which uses a dedicated transmit diversity feedback, e.g., an explicit instruction from the base station to adjust the transmit diversity parameter.

When a mobile device accesses the wireless network at the cell edge, especially when uploading data at peak possible rate it is transmitting at high power; MTD may provide a battery power savings by virtue that diversity gain allows the use of lower transmitter power to provide the same Effective Isotropically Radiated Power (EIRP) than a non-diversity unit. Therefore, at cell edge, where the propagation losses are high, or in high fading situations, the diversity gain may provide continued operation, even when a non-diversity UE would cease to maintain a connection as well as higher data rate and better quality than a single antenna UE. However, when only low transmitter powers are required, for example, e.g. when the UE is close to the base station or when in mid range but at low data rate, reduced power amplifier efficiency at low power plus the additional operating current of the Phase Modulator (PM) or the additional RF channel required to route the baseband resident PM, may result in a decreased battery life than would be provided by a non-diversity UE in a similar situation. Embodiments of the invention may allow MTD devices to benefit from power saving when doing so would be beneficial, but not to suffer excessive power consumption when doing so would be costly. According to some embodiments of the invention, some excessive power consumption, within a predetermined limit, may be acceptable for a possible gain in network capacity.

FIG. 1 is a schematic diagram of a system according to an embodiment of the invention. FIG. 1 depicts a mobile communication device (UE) having a plurality of antennas in wireless communication with a base station. Although two antennas are shown, it will be understood that principles of the invention are equally applicable to a UE with more than two antennas, which is also within the scope of the present invention.

In some embodiments of the invention, the mobile device may include two or more transmit paths, or channels, each associated with a respective transmit antenna. Such a transmit path may include, for example, an RF power amplifier, and a transmit antenna. One or more of the transmit paths may include a diversity parameter adjustment module, e.g., a phase modulator if the transmit diversity parameter is a relative phase.

Figure 2:
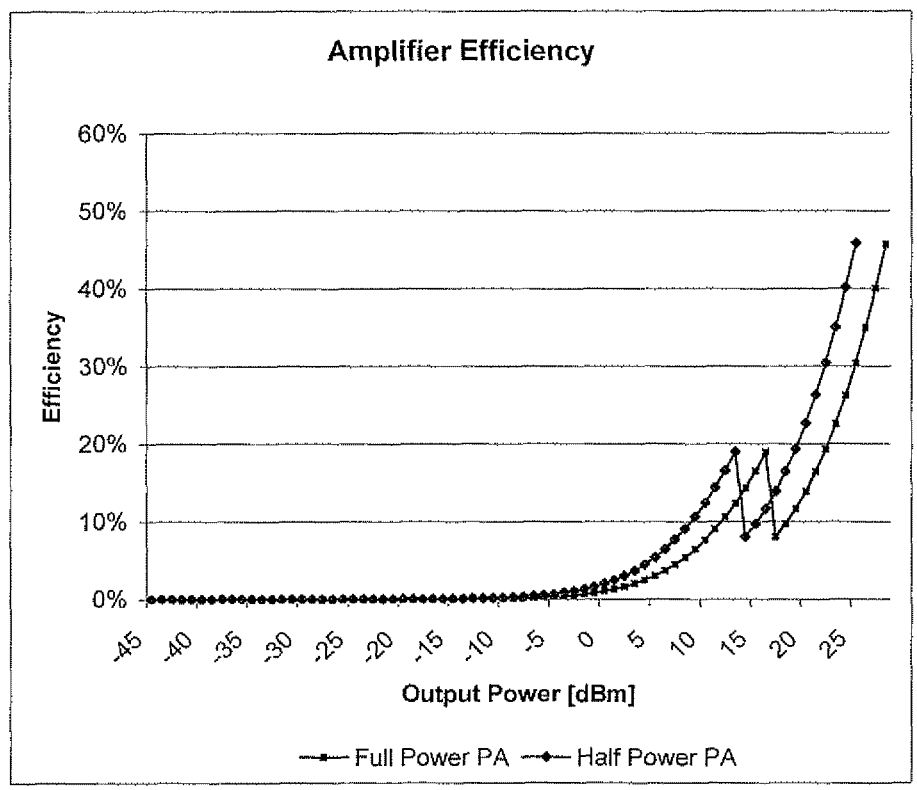
FIG. 2 is a schematic diagram of amplifier efficiency versus a range of output power of a full power and half power PAs in accordance with an embodiment of the invention.

FIG. 2 is a schematic diagram of amplifier efficiency (%) plotted against a range of output powers (dBm) of full-power and half-power amplifiers in accordance with an embodiment of the invention. According to one embodiment of the invention for example a power amplifier rated for +28 dBm, which may be capable of providing a +24 dBm output to an antenna if there are 4 dBm circuit losses between the PA and the antenna. Under similar conditions, for purposes of comparison, a half-power PA may provide in this example +21 dBm to the antenna.

Figure 3:
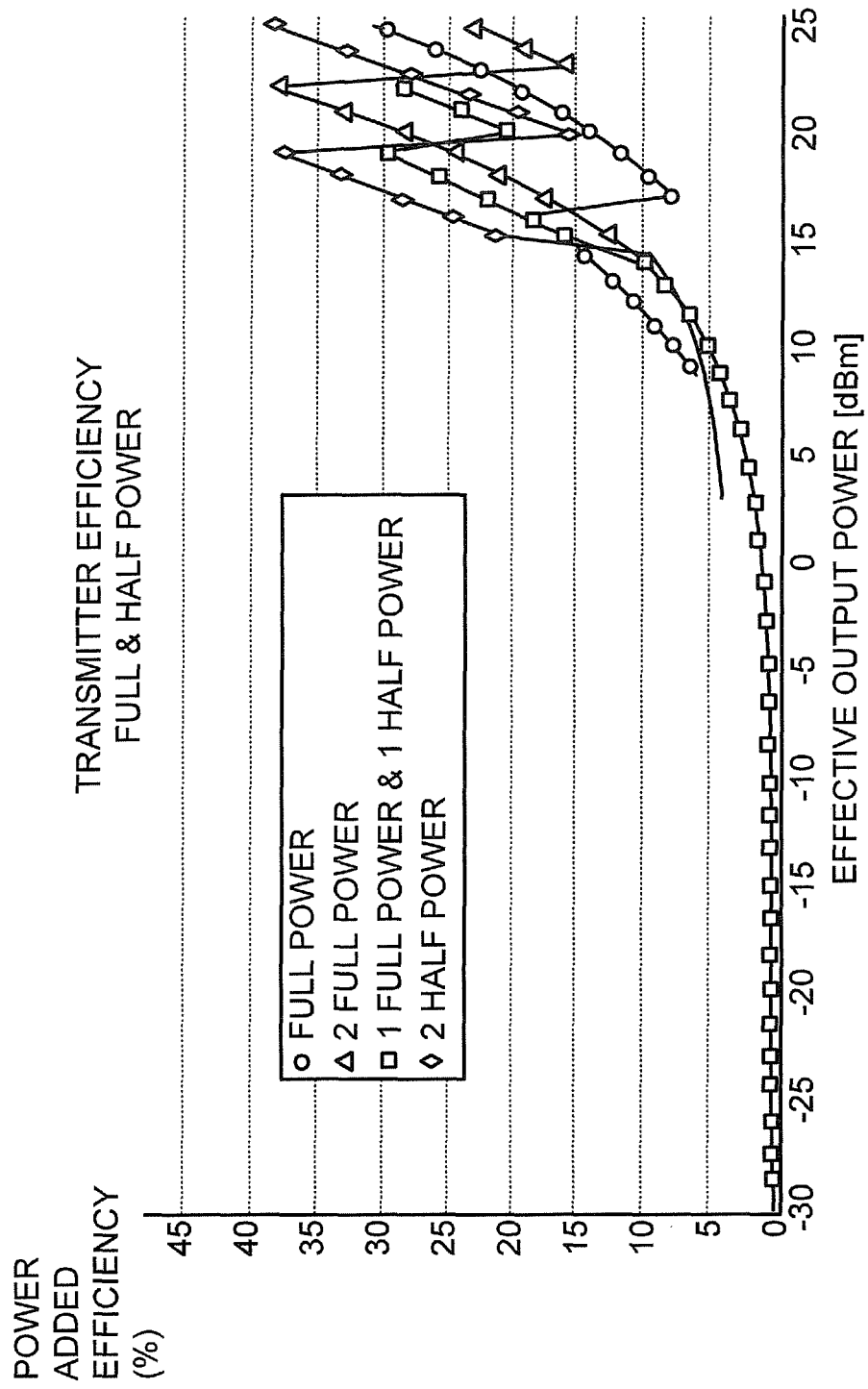
FIG. 3 is a schematic diagram of amplifier efficiency versus a range of output power of a full power PA, half power PA and a Full and Half power PAs with Gd in accordance with an embodiment of the invention.

FIG. 3 is a schematic diagram of amplifier efficiency (%) plotted against a range of output powers (dBm) of a full power amplifier and variation of two amplifiers operating with diversity gain including, two full-power amplifiers, full- and half-power amplifier and two half-power amplifiers. FIG. 3 compares the efficiency of each of these power amplifiers in an example of an MTD system according to an embodiment of an invention. For example, one full-power amplifier and one half-power amplifier may be operated simultaneously to produce a diversity gain (Gd) of, for example, 3 dB. It will be understood that the diversity gain of 3 db is used for purposes of illustration, and does not limit the value range of Gd, which may be any one of a wide range of possible values. FIG. 3 shows that the efficiency of the transmitter may vary considerably as the output power varies. Efficiency of the transmitter may refer to radio frequency power produced divided by the DC power required to produce it. RF power may refer to the power in a radio frequency signal, which may be a combination of a plurality of signals, and may include any constructive interference, including Gd.

The curves represented in FIG. 3 show that at higher powers, MTD may provide optimal efficiency. The implementation of MTD which uses two full-power power amplifiers may be more efficient in a part of the high power range, but may be less efficient than other MTD implementations illustrated in FIG. 3 when transmitting at other output powers. The implementation of MTD which uses two half-power power amplifiers may be more efficient according to FIG. 3, at lower powers, for example around +17 dBm and at the very high power range, for example 25+ dBm than other MTh implementation illustrated in FIG. 3. The implementation of MTD which uses one half-power and one-full power MTD variation may not be as efficient at its optimal efficiency power as the other two implementations, but it may be capable of operating at a higher efficiency over a broader range of medium and high power ranges. The implementation of MTD which uses one half-power and one-full power MTD variation may provide a higher efficiency on average relative to other MTD implementation illustrated in FIG. 3. As discussed above, high power operation is important, because high powers may imply high transmitter current being drawn by the UE's power amplifiers. According to embodiments of the invention, such high power and current conditions may occur when the UE is operating at the cell edge, or during high fading conditions. Increased transmitter efficiency at high output power may produce significant reduction in UE operating power.

According to FIG. 3, however, at lower output power, for example, below +10 dBm, it may be more optimal with regard to power efficiency to operate with the UE in non-diversity mode, i.e., to disable MTD. According to embodiments of the invention, disabling MTD may be accomplished through a plurality of processes, as described herein. In the example of FIG. 3, it may be power efficient to operate with the example half power PA.

According to embodiments of the invention, current loss may be avoided in low power conditions, when non-diversity operation is enabled (or diversity operation disabled). Disabling MTD may involve powering down, e.g., disconnecting from a power source or switching to standby mode, the phase modulator and/or half-power amplifier, or disabling the second RF path that routes the baseband residing phase modulator. Current savings may refer to a decrease in the power drawn by the UE in total, particularly in relation to a real or hypothetical non-diversity transmitter operating in similar conditions.

Figure 4:
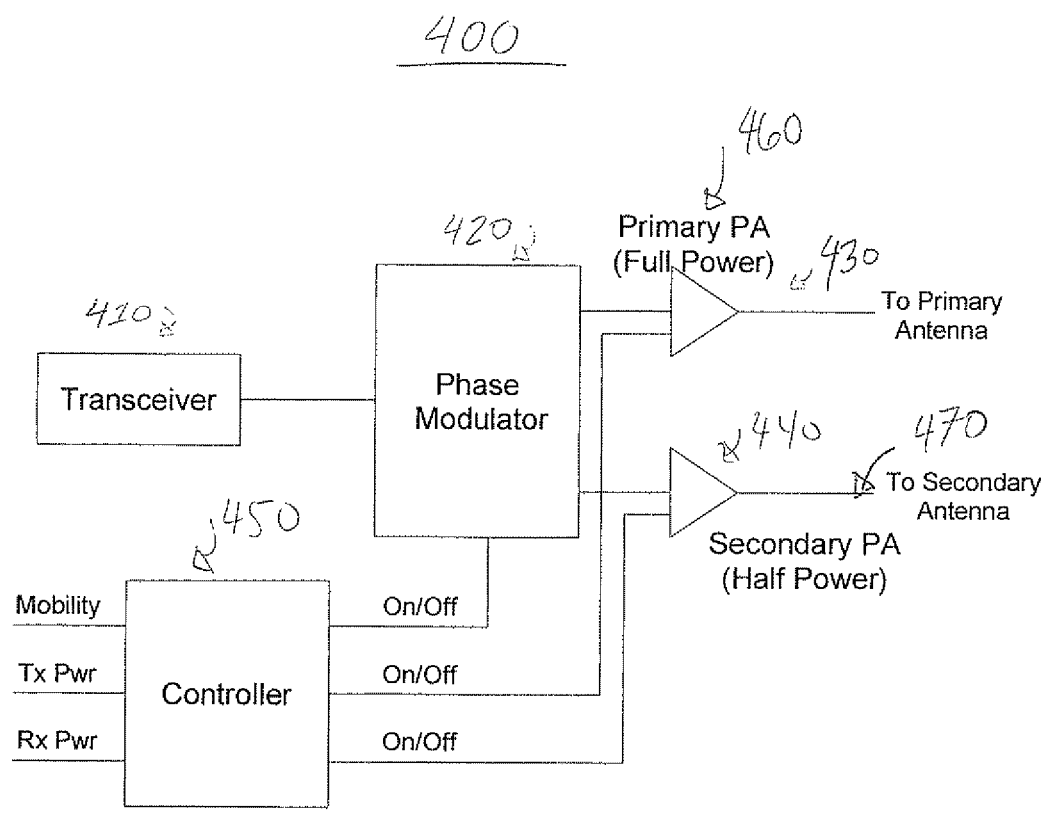
FIG. 4 is a schematic diagram of a device according to an embodiment of the invention.

FIG. 4 is a schematic diagram of a device according to an embodiment of the invention. As shown, the mobile communication device may include a transceiver (410) and at least two transmit paths. A primary transmit path (430) may be associated with a primary power amplifier (460), which may provide signal amplification to the full specification power of the device, and a secondary transmit path (470) associated with a secondary power amplifier (440), which may provide signal amplification to a fraction, e.g., half, of the specification power of the device. Each path may have a respective associated antenna. The device may include one or more diversity parameter modulators, e.g., a phase modulator (420), which may be associated with one or more transmit paths. It will be recognized that the phase modulator may comprise a plurality of phase modulators on each or both of the transmit paths. A controller (450) may be connected to receive inputs and produce outputs to control various operations of the transmit paths, as described herein. For example, the controller may provide an enabling/disabling signal to any or all of the phase modulator (420), the primary power amplifier (460), and the secondary power amplifier (440).

It will be recognized that although the embodiment of FIG. 4 shows full- and half-power amplifiers, in other embodiments of the invention, the amplifiers may both be fractional power, having different fractions of specification power, e.g., half and quarter power, or similar fractional powers, e.g., both half of specification power, or may both be full-power amplifiers. For example, in some embodiments of the invention, the power amplifiers on the respective transmit paths may have the same transmit power, e.g., each may be rated for a fraction (e.g., half or quarter) of the specification power limit of the device as a whole based on its class. It will be further understood that the optimal efficiency of an amplifier may be modified by altering its supply voltage. Thus, for example, a "full-power" power amplifier may be turned into a "half-power" power amplifier by halving its supply voltage, thereby shifting its point of optimal efficiency to half the power.

According to embodiments of the invention, as described below, the mobile communication device may use both power amplifiers in transmit diversity as described above, and then, e.g., in response to a condition as described below, use only one of the power amplifiers, e.g., the primary amplifier, in non-diversity transmit mode. In such embodiments, although diversity gain may be given up by transmitting over one transmit path or the other, one antenna may be a better choice due to power consumption considerations.

Although additional embodiments of the invention described below refer to two amplifiers, e.g., a high power amplifier and a low power amplifier, or a full-power and half-power amplifier, it will be understood that the methods described are fully applicable to embodiments having more than two power amplifiers.

In some embodiments of the invention, the power amplifiers in the transmit paths may be rated for a different output power. For example, a first power amplifier in a first transmit path may be rated to transmit a high power and a second power amplifier in a second transmit path may be rated to produce a lower power. More specifically, as depicted an embodiment of the invention shown in FIG. 4, the first power amplifier may be rated to transmit a full power allocated to the device unit of its class, e.g., +24 dBm, and be connected to the primary antenna, and the second power amplifier may be rated to transmit a fraction, e.g., half, of the full power allocated to the device unit of its class, e.g., +21 dBm, and be connected to the secondary antenna.

It will be recognized that when employing transmit diversity, the base station may receive a signal power level approximately equal to effective received power Pe, where Pe=[Pt+ Antennas gain+Gd−Power Loss in Path]. Pt may be the-power Pout driving the mobile's antennas assembly, and Gd is the diversity gain provided by coherently transmitting more than one signal. If the mobile device is transmitting at the maximum power allowed by its class, the range from the base station with which it can operate satisfactorily may be extended past a non-diversity mobile device because of the diversity gain Gd. Less power may be used for transmission by a diversity mobile device than a non-diversity mobile device in order to maintain the same range, which may lead to a potential current consumption saving.

According to some embodiments of the invention, the UE includes a transceiver as shown in FIG. 4, and may include providing the drive signal to a Phase Modulator (420). The Phase Modulator (420) may apply to the transmitted signals a phase shift between the primary and secondary transmit paths.

According to an embodiment of the invention, the primary transmit path (430) may include a full-power power amplifier (PA) (460) and the secondary transmit path (470) may include a half-power PA (440).

According to some embodiments of the invention, the UE transmitter may be switched between diversity and non-diversity operation. The switching action may at least in part be based on a condition associated with the level of transmitted power. Transmitted power may refer to any or all of the transmit power of one or both of the transmit paths, the power received by a station, or a substitute parameter such as received power, or the like.

In order to selectively activate or deactivate diversity transmission, the diversity controller may place the Phase Modulator and/or Full Power PA in active or standby mode, or shut it off, for example, by changing the value of an enable/disable/standby input pin, depending on whether diversity operation (active) or non-diversity operation (standby) are commanded. As described below, switching may be affected by additional parameters, e.g., capacity considerations such as refraining from switching during increased transmission activity, and/or mobility detection, e.g., anticipating a trend in transmit power based on motion of the UE towards or away from a base station.

Figure 5A:
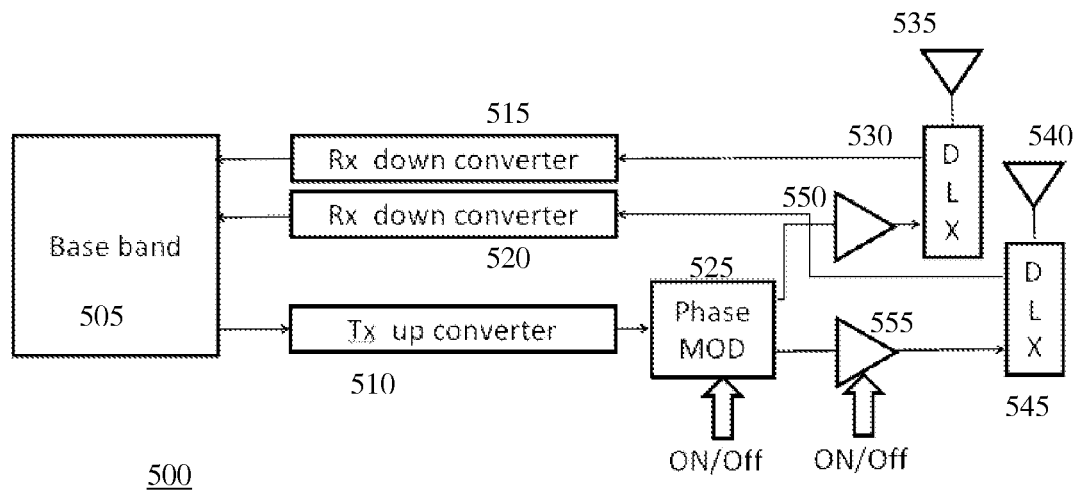
FIGS. 5A and 5B are schematic diagrams of devices according to embodiments of the invention.

FIG. 5A is a schematic diagram of a device according to an embodiment of the invention (500). As shown, the mobile communication device may include a baseband processor (505) and at least two transmit paths. Each of the transmit paths may include an RF transmit up converter, an RF receive down converter, an amplifier, a duplex module, and an antenna. A down converter may refer to a module that converts an input signal centered at a radio frequency, for example, as received by the antenna, or an intermediate frequency to a baseband signal centered at the zero frequency. An up converter may refer to a module that converts an input baseband signal centered at the zero or Intermediate frequency to an RF signal centered around the transmission frequency for transmission by the antenna. Accordingly, for example, a primary receive path may be associated on the receive side with a receive RF down converter (515), and on the transmit side with a transmit RF up converter (510), which may be shared with the secondary transmit path, and a high or full power amplifier (550), which may provide signal amplification to the full specification power of the device. The primary transmit and receive paths may share an antenna (535) using a duplex module (530). Likewise, a secondary transmit path may be associated on the transmit side with the shared transmit RF up converter (510) and a low or fractional power amplifier (555), which may provide signal amplification to a fraction of the full specification power of the device, and on the receive side with an RF receive down converter (520). The secondary transmit and receive paths may share an antenna (540) using a duplex module (545). The device may include one or more diversity parameter modulators, e.g., a phase modulator (525), which may be associated with one or more transmit paths. In the embodiment shown, the phase modulator (525) may be a separate module that receives an up converted signal from the baseband processor and produces two transmit signals differing by a diversity parameter.

Figure 5B:
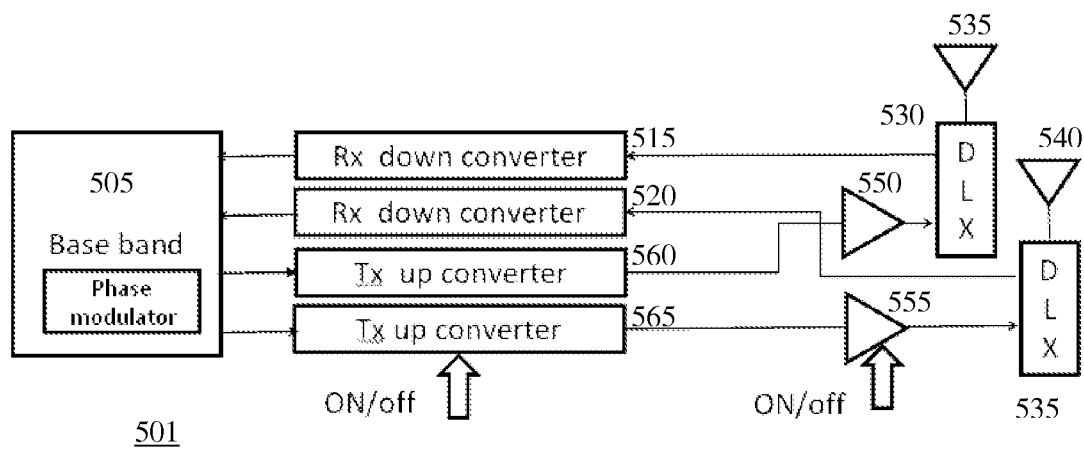

FIG. 5B depicts an alternative embodiment of the invention (501), in which the phase modulation is not performed by a separate module, but rather, is performed directly by the baseband processor in the baseband frequency prior to up conversion to the RF frequency. In the embodiment shown, each of the primary and secondary transmit paths may have its own RF up converter module (560 and 565). It will be recognized that the principles of the invention apply to the embodiments depicted in FIGS. 5A and 5B, as well as other configurations.

The baseband processor (505) may be connected to receive inputs and produce outputs to control various operations of the transmit paths, as described herein. For example, the controller may provide enabling/disabling signals to any or all of the phase modulator, the primary and secondary power amplifiers, and the RF transmit up converters. In the embodiment depicted in FIG. 5A, the baseband processor (505) may be connected and able to disconnect or place on standby the phase modulator (525), and the secondary power amplifier (555). In the embodiment depicted in FIG. 5B, the baseband processor (505) may be connected and able to disconnect or place on standby the secondary RF up converter module (565), and the secondary power amplifier (555).

According to an embodiment of the invention, an offline measurement and calibration procedure may be performed to set threshold values that may be used in online operation of the mobile device. Offline may refer to a UE state during production or when the UE is not actively transmitting a data signal to a base station, such as during a power up cycle.

In one such calibration, using mobile transmit diversity, the mobile device may first perform an offline measurement of diversity operation, for example, mapping a plurality of possible $P_{out}$ levels against the digital calibration table in the baseband processor. Accordingly, for each such possible $P_{out}$ level, the current consumption of the entire transmission circuitry (e.g., the two RF up converters, the phase modulator(s), the power amplifiers, and any other active circuitry related to the transmit chain used in the UE) may be measured. Next, with the mobile transmit diversity off (non-diversity operation), the UE may disconnect the diversity transmission components (e.g., the phase modulator, the secondary power amplifier, and the secondary RF up converter) from the power supply, and repeat the measurement of current consumption for various power levels. It will be recognized that the various components involved in diversity or non-diversity transmission may vary from embodiment to embodiment. For example, in the embodiment depicted in FIG. 5B, there may not be a phase modulator whose current consumption is to be measured. Furthermore, it will be recognized that the UE may place various diversity transmission modules or components in standby mode, rather than necessarily disconnecting them from power.

According to some embodiments of the invention, in operation, the UE may be switched between diversity and non-diversity operation. The switching action may at least in part be based on a condition associated with the level of transmitted power. Accordingly, after offline calibration, the UE may have stored a correlation between power (or current) consumption in diversity or non-diversity operation for each of a variety of transmission power levels. Such a look up table may be used during online operation in order to compare a power (or current) consumption in an operative transmission mode (e.g., diversity) to a threshold based on the stored power consumption in the alternative transmission mode (e.g., non-diversity). It will be recognized that while current consumption is discussed herein as a measure of power, other parameters may be used for measurement and/or comparison. For example, if a voltage may be varied, for example, when using lower voltage to supply power to an amplifier in a fractional power mode, the voltage may likewise be taken into consideration. In some embodiments, other parameters, e.g., a TPC signal or sequence, receive power, and/or signal quality indicators, may be used in the power consumption calculations.

According to an embodiment of the invention, the offline calibration may be performed by using the UE enabled to MTD operation and measuring various power parameters. Measurements may include power and/or current draw and other characteristics of the components or whole transmit paths of the UE. The measurements may be used to map possible levels of the transmit power versus a calibration table. The calibration table may refer to a data reference referred to below used to calculate the threshold level or may refer to a separate data reference. Possible transmit power values may refer to all or a plurality of possible power levels, all or a plurality of possible power levels in the operational range of the UE, or a sample of all or a plurality of possible power levels, which may be sampled at defined increments.

According to one embodiment of the invention, for each possible transmit power level, the current consumption of the entire transmission circuitry may be measured and recorded or stored in a memory. The entire transmission circuitry may include a phase modulator (if separate), two power amplifiers, and/or other active circuitry of the UE, e.g., one or more transmit RF up converters.

The calibration process may then use an MTD enabled UE operating with the MTD off. The power supply or plurality of supplies may be disconnected from the transmit diversity circuitry or modules, e.g., a phase modulator (if any), the secondary power amplifier, and/or a transmit RF up converter.

According to an embodiment of the invention, the transmit diversity components may be disconnected from the power supply. According to some embodiments of the invention, power disconnection may refer to a standby mode.

According to some embodiments of the invention, the calibration process may generate a table or other form of data reference for all possible transmit power levels, which may be stored in a memory of the UE for use during online operation. Such a table may contain a plurality of entries representing current consumption differences between MTD on operation and MTD off operation. According to one embodiment of the invention, the table may include additional parameters for consideration during online comparisons, e.g., current consumption differences corresponding to a plurality of transmit diversity gains (Gd), e.g., 1 dB, 2 dB, or 3 dB.

According to one embodiment of the invention, a further method may be used calculate a current consumption difference for a given pair of power and Gd values. For each db of gain Gd the maximum possible transmit power of the table may be a defined number of dB lower corresponding to the value of the Gd in dB. This may cause the current drawn to be lower per the same calibration table. The table representing the current consumption difference containing values representing MTD on operation and MTD off operation may be created by shifting both values for each transmit power level a number of transmit power levels corresponding to the value of Gd in dB, such that the current saving may be increased for every transmit power. For example, if the Gd is 2 dB, the values corresponding to diversity and non-diversity operation in the table may be shifted by 2 places, such that the current saving gain for each transmit power may increase and respectively the current losses at low level transmit power may be reduced.

In order to selectively activate or deactivate diversity transmission, the diversity controller may place the Phase Modulator, Full Power PA and/or the associated TX up converter in active or standby mode, for example, by changing the value of an enable/disable input pin, depending on whether diversity operation (active) or non-diversity operation (standby) is warranted. As described below, switching may be affected by additional parameters, e.g., capacity considerations such as refraining from switching during increased transmission activity, and mobility detection, e.g., anticipating a trend in transmit power based on motion of the UE towards or away from a base station.

Figure 6:
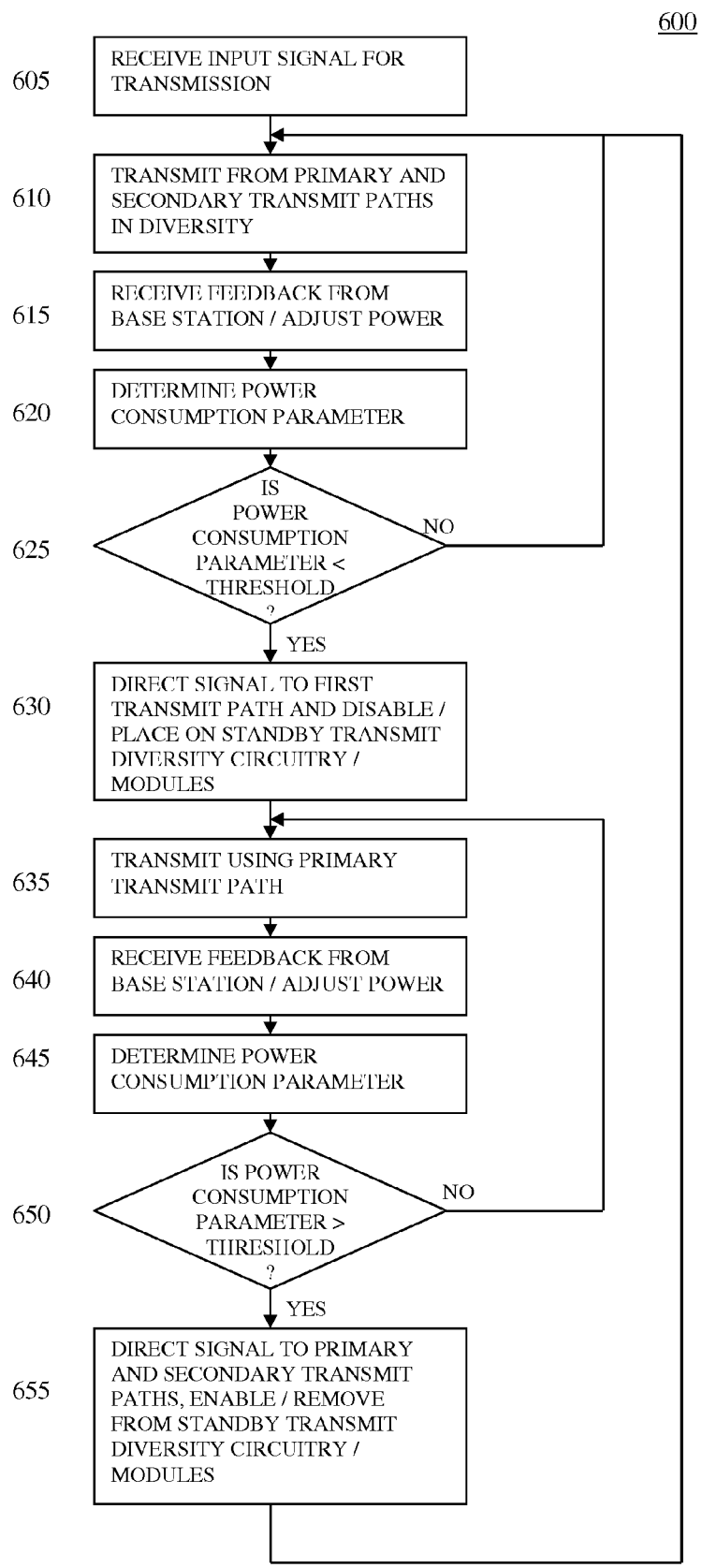
FIG. 6 is a schematic flow chart diagram of a method in accordance with embodiments of the present invention.

FIG. 6 is a schematic flow diagram of a method 600 in accordance with an embodiment of the invention. An input signal may be received for transmission by the UE (605). The input signal may refer to a single input signal, a plurality of input signal such as those that may occur during burst communication or a stream of input signals. According to embodiments of the invention, the input signals may be received at an interface of the UE device, or at an interface of an element within the UE device.

According to embodiments of the invention, the UE may transmit a signal based or corresponding to the input signal. When operating in diversity mode, the UE may transmit the signal simultaneously over first and second paths, e.g., primary and secondary transmit paths, wherein the transmit signals differ by the transmit diversity parameter (610). Each transmission path may include a power amplifier and may be associated with an antenna capable of sending signals.

According to an embodiment of the invention, the base station may provide feedback to the UE, e.g., a TPC signal, instructing the UE to increase or decrease power, and the UE may comply with the instruction by increasing or decreasing transmit power (615). It will be understood that adjusting the power may be performed in any suitable manner, as known in the art. For example, adjusting the power of the amplifier may be accomplished by sending a signal from the controller to a PA or an associated receiving interface. The signal may contain data instructing a PA to increase or decrease the amplification by a factor or a set amount. According to an embodiment of the invention, the data may instruct the amplifier to adjust the amplification to comply with an exact power value or within a specified range. It will further be understood that such power adjustment may be made in conformance with power control requirements of the relevant protocol.

According to embodiments of the invention, after or during adjustment of the power of the first and/or second transmit paths, the power levels may be read. The transmit power may comprise, or be used in calculating, a power consumption parameter. According to embodiments of the invention, the UE may determine a power consumption parameter (620). A power consumption parameter may refer to one or a plurality of parameters and may be based at least in part on a transmit power of the UE or any other or additional power parameter. A power consumption parameter may be determined based on a static function of the transmit power, a result of a preset algorithm, a dynamically calculated function of the transmit power, or based on a further action or input.

For example, according to one embodiment of the invention the power consumption parameter may be a function of the current drawn by one or both transmit paths and/or other component of the system. According to another embodiment of the invention, power consumption parameter may be calculated based on one or more prestored data references, such data reference may include one or more of a list, a queue, a table, a database or the like, for example, as produced during an offline calibration procedure.

According to an embodiment of the invention, the power consumption parameter may be determined by an algorithm which may include measuring the transmit power level, finding the corresponding value in a prestored look up table containing the power or current consumption difference values, and according to an algorithm, setting an associated power consumption parameter. According to another embodiment of the invention, the algorithm may include a step comparing the values corresponding to diversity and non-diversity operation for the transmit power level and may include a further calculation based on the result of the comparison.

It will be understood that the power consumption parameter need not be based on an actual power consumption calculation, but may be, in some embodiments, based directly or indirectly on the transmit power. For example, in some embodiments, during diversity transmission, the power consumption parameter may be a threshold transmit power of one or both transmit paths, below which the UE may disable MTD. Similarly, in some embodiments, during non-diversity transmission, the power consumption parameter may be a threshold transmit power of the primary transmit path, above which the UE may enable MTD. The power consumption parameter may take into account current drawn by the first and/or second paths, which may include the associated power amplifiers. According to an embodiment of the invention, the power of the first and second paths may refer to the actual power drawn by the first and second transmit paths, to the transmit power actually received by the base station, or to a result of an algorithm which may correspond to the transmit power the base station may be receiving. The thresholds for enabling/disabling MTD may be the same, or, as described below in connection with hysteresis, in some embodiments, the thresholds for enabling and disabling MTD may be different.

According to embodiments of the invention, the power consumption parameter of the first and second paths, which may include the associated power amplifiers, may be compared to a power threshold or power threshold range (625). According to embodiments of the invention, the threshold range may be a range of power values which may be statically predetermined for the UE, e.g., upon calibration or configuration, a static range which may be determined by the UE at the beginning of an operation cycle, or a dynamically varying threshold range, which may be determined during the operation of the UE. According to embodiments of the invention, the threshold range may be determined by any suitable process, including actively measuring power, current and/or other characteristics of the UE, receive input signals, including signals from the base station, or activity indicators generated in the UE, and may rely on algorithms, databases, look-up tables, and the like. According to an embodiment of the invention, the range may be determined through the process disclosed below.

If the transmit power is not less than the threshold, the UE may continue to transmit in diversity mode, repeating steps (605) to (620) for incoming input signals.

If the transmit power is below a threshold, the controller may disconnect or place on standby transmit diversity circuitry or modules, e.g., elements of the secondary transmit path such as the phase modulator, and/or secondary power amplifier, and transmit a data signal in non-diversity mode (630). According to embodiments of the invention, this may be accomplished by issuing a signal or a plurality of signals to switch operation from diversity to non-diversity operation, for example, by directing the transmit signal to one of the transmit paths, and disabling or placing on standby the power amplifier of the non-selected transmit path and the phase modulator. In an embodiment of the invention, the transmit path selected for non-diversity operation may be the transmit path having the low or fractional power amplifier, and the non-selected transmit path may be the one having the full or high power amplifier. It will be recognized that in another embodiment of the invention, the selected path may include the full or high power amplifier, and the non-selected transmit path may include the low or fractional power amplifier. In yet other embodiments of the invention, the controller may be capable of selectively disabling either power amplifier. For example, the controller may determine based on the transmit power whether to disable the high power amplifier (e.g., for low power requirements), or the low power amplifier (e.g., for low to mid-range power requirements).

According to embodiments of the invention, directing the transmit signal to one path may refer to a plurality of conditions wherein the first path is used to transmit the signal associated with the input signal, while the second transmit path is not used, e.g., disabled, in standby, or in another non-transmitting state. According to an embodiment of the invention, the controller may cause switching between diversity and non-diversity transmit modes may be produced by sending a signal or signals directly to the phase modulator and non-selected power amplifier, by indirectly controlling such components, by sending a signal to one or more of an interface, a plurality of switches, associated controllers, or the like.

According to some embodiments of the invention, setting a component to standby power may refer to commanding the component to execute low power operation processes or commanding the component or associated controller to reduce the power supply to the component to a low power level, which may be referred to as a standby power level. According to an embodiment of the invention, the standby power level may refer to disabling the power of the component such that component receives no power, or a like equivalent.

According to embodiments of the invention, the UE may then proceed to transmit a signal only the selected transmit path (635). In some embodiments, the selected transmit path may be the transmit path including the low power amplifier. In some embodiments, the selected transmit path may be the transmit path including the high power amplifier. In some embodiments, the controller may determine whether to select the transmit path including the low or high power amplifier based on a transmit power parameter.

According to some embodiments of the invention, the method may receive a power feedback from the base station, and adjust the transmit power (640), substantially as described above.

The method may then determine a power consumption parameter on the selected transmit path (645), for example, substantially as described above.

According to embodiments of the invention, the power consumption parameter of the selected transmit path, which may include the associated power amplifier, may be compared to a power threshold or power threshold range (650). The threshold used in (650) may be equal to or different from the threshold used in (625).

If the transmit power is not greater than the threshold, the UE may continue to transmit in non-diversity mode, repeating steps (630) to (645) for incoming input signals.

If the transmit power is greater than a threshold, the controller may switch from non-diversity to diversity operation, for example, by connecting, enabling, and/or removing from standby circuitry and/or modules associated with transmit diversity, e.g., elements of the secondary transmit path such as the phase modulator and/or secondary power amplifier, so as to transmit in diversity mode (655), and the process repeated for incoming input signals.

Figure 7:
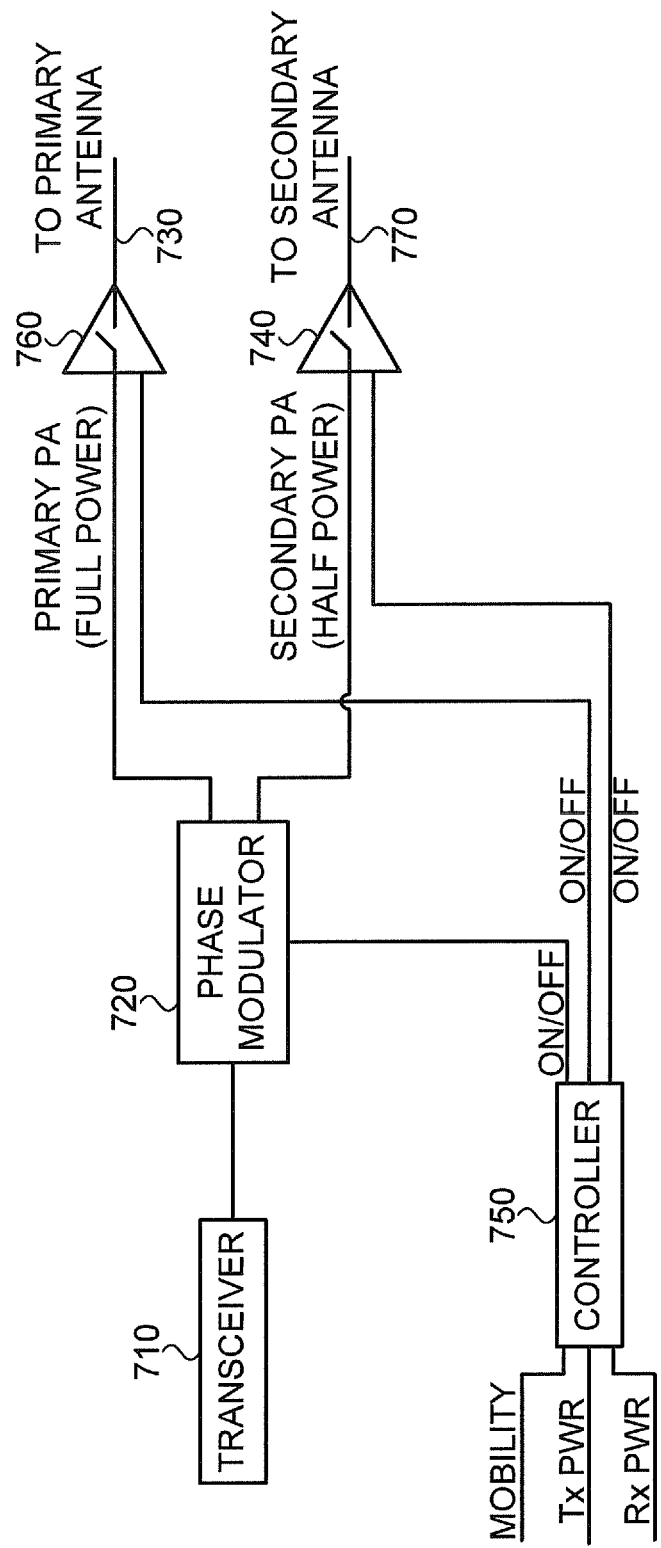
FIG. 7 is a schematic diagram of a device according to an embodiment of the invention.

FIG. 7 is a schematic diagram of a device according to an embodiment of the invention. As shown, the mobile communication device may include a transceiver (710) and at least two transmit paths: a transmit path (730) associated with a Primary PA circuit (760) and a primary antenna, and a transmit path (770) associated with a Secondary PA circuit (740) and a secondary antenna. The device may include a diversity parameter modulator, e.g., a phase modulator (720), which may be associated with one or more transmit paths. A controller (750) may be associated with functions including, but not limited to, control over the phase modulator (720) and the transmit paths which may include the PAs.

According to some embodiments of the invention, the Primary PA circuit (760) and the Secondary PA circuit (740) may include associated PAs and a plurality of switches, or other components capable of routing a transmission signal either to amplification operation or routing the signal directly to the antenna with no amplification operation. Routing directly may refer to routing the signal through the PA without amplification, or may refer to disconnecting the amplifier and bypassing the signal to the antenna around the PA. According to an embodiment of the invention, the plurality of switches may be operable by signals from the controller.

According to some embodiments of the invention, FIG. 7 may function similarly to the embodiment of the invention in FIG. 4, with the additional feature that the diversity operation may be maintained throughout the signal level range. According to an embodiment of the invention, when power saving is desired, the one or both power amplifiers may be bypassed with internal or external switches, and the Phase Modulator outputs may be routed to the associated antennas of each of the transmit paths. The diversity operation in this embodiment may be continuous. In some embodiments of the invention, the transition from power amplification to the power amplifier bypass mode may be directly performed, if the relative phase shift between the signals may be small, e.g., within 5 degrees, 10 degrees, or 20 degrees.

According to an embodiment of the invention, power saving may refer to a condition when the power of the first and second transmit paths is below a low power threshold range. The threshold range may refer to one or more of the methods of implementing a threshold described above. According to another embodiment of the invention, the low power threshold may be produced using the method disclosed below and may require additional algorithms or data bases.

According to some embodiments of the invention, if the power of the first and second transmit paths is below the low power threshold range then the controller may send a signal or plurality of signals to direct the PAs or associated switches or controllers to route the transmit signals directly to the associated antennas and to direct the High Power and Low Power PAs to enter stand by level power consumption. Standby level power consumption may be achieved through one or more of the methods disclosed above.

According to some embodiments of the invention, the transmit power switching may be implemented such that the UE is not required to switch between diversity and non-diversity operation during data transmission so as not to introduce phase shift discontinuities into the transmitted signal, which may vary as much as 20 dB during burst data communications. According to some embodiments of the invention impact on the data transmission may be reduced by a combination of transition thresholds and delay between transition operations.

According to some embodiments of the invention a procedure may be implemented when the UE goes from non-diversity to diversity operation. A function of the diversity controller may be to ensure the signals from the two diversity antennas arrive at the base station with a constructive phase relationship. According to one embodiment of the invention, ensuring that the signals arrive at the base station with a constructive phase may be a continuous process performed by adjusting for phase relationship changes caused by motion of the UE with respect to the base station and other propagation effects.

According to some embodiments of the invention, when the UE is operating in a non-diversity mode, it may have no information to track phase changes. According to one embodiment of the invention, when the UE switches to diversity operation it may begin in a start up mode. In the start up mode the UE may employ initialization algorithms to acquire the proper phase quickly. Various initialization methods may be implemented, depending on desired results and other factors. After the start up mode may have achieved a proper connection regime, the UE may employ slower acting but more precise algorithms to maintain the phase and track needed phase changes. Various algorithms may be implemented, depending on desired results and other factors According to one embodiment of the invention, the initial phase settings at the time diversity operation may be activated may provide a destructive relationship rather than a constructive relationship when the signals reach the base station. Signals which arrive at the base station in a destructive manner, resulting in a higher power (i.e., amplification power) than necessary before the signal is suitably received and acknowledged at the base station. Such high power transmissions may disturb other non-serving base stations near the mobile communication device.

According to one embodiment of the invention, if the period of time the UE may have been operating in non-diversity is short relative to the motion of the UE with respect to the base station, a method may assume the last phase setting is valid and may continue the phase tracking process from the last phase setting.

According to another embodiment of the invention, if the period of time the UE may have been operating in non-diversity is long with respect to the motion of the UE, the method may first implement an initialization process before regular diversity operation begins.

According to an embodiment of the invention, mobility detection may be used during the diversity operation to predict the rate of change of the phase to determine the appropriate method to use when the UE switches from non-diversity to diversity operation.

According to another embodiment of the invention, the rate of change of amplitude and phase of the downlink may be used when available to assist the mobility determination process.

Figure 8:
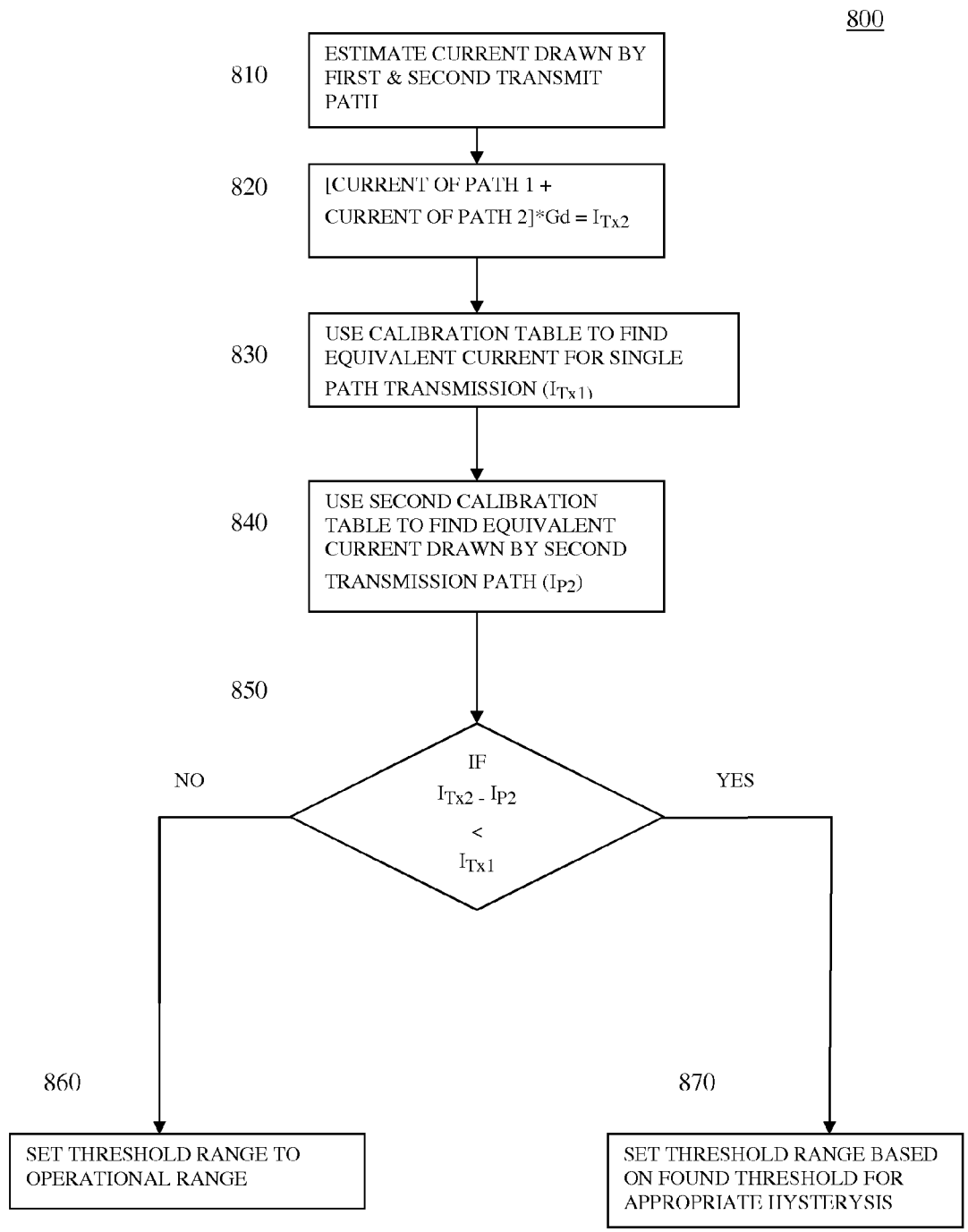
FIG. 8 is a schematic flow chart diagram of a method in accordance with the embodiments of the present invention.

FIG. 8 is a schematic flow chart of method 800 according to an embodiment of the invention. Method 800 may describe one of the many possible methods to determine the threshold range. Method 800 may estimate the current drawn by the first and second transmit paths (810). Estimating the current may refer to looking up a Pout/current consumption calibration table, dynamically monitoring the current drawn, accessing the current data available in the UE or determining the current based on one or more variables. According to one embodiment of the invention, estimating the current a may be done by a process while the UE is off line. The process may be used to map current drawn by the first and second transmit paths into a calibration table which may be used by the UE to control Pout.

According to one embodiment of the invention an equivalent current drawn may be determined corresponding to the power transmitted during diversity transmission.

The total current drawn by the first and second paths may be adjusted for the diversity gain Gd (820). A calibration table which may be in the form of a list, or a multidimensional data base or other form of data storage not restricted by any type of reading, writing or storage characteristics. According to some embodiments of the invention, the calibration table may be used to determine the equivalent current variable which may correspond to the current drawn by a low power amplifier in the first transmit path to be able to transmit an equivalent transmit power (830). According to one embodiment of the invention, this calibration table implements a directly proportional algorithm of diversity current draw to non-diversity current draw. According to another embodiment of the invention the calibration table may take into account additional factors, elements or algorithms to adjust for a plurality of predetermined conditions associated with diversity and non-diversity transmission.

According to an embodiment of the invention a second calibration table may be utilized to determine an equivalent current drawn by the second transmission path excluding the High Power PA, corresponding to the current drawn by the first and second transmit paths (840).

According to some embodiments of the invention, if the equivalent current draw of the transmit power (820) minus the equivalent current draw of the second transmit path excluding the High Power PA (840) is less than the equivalent current draw of non-diversity operation found in 830 (850). According to one embodiment of the invention a threshold range may be set using the power of the first and second transmit paths combined (870). The range may be set for optimal hysteresis and other desired characteristics of how switching between non-diversity and diversity may occur. Hysteresis may refer to a threshold range which may be implemented intentionally to prevent unwanted rapid switching as may occur in the UE during switches in and out of diversity operation. This and similar techniques may be implemented to compensate for properties of the UE or noise in the electrical signal.

According to another embodiment of the invention the sum of the power of the first and second transmit paths may be used as the middle of the range, at some other predetermined part of the range, or the range may be calculated based on the power, but the power may fall outside of the determine threshold range.

According to embodiments of the invention, a dynamic threshold range may be determined when the UE is operating in non-diversity transmission operation. For example, according to one embodiment of the invention, the threshold as calculated based on power consumption may be shifted or biased based on additional considerations, for example, by factoring some possible current loss into the calculation to set adjust the threshold within a threshold range. For example, possible current loss may include current loss when the network may be close capacity outage. Current loss may be limited at a defined maximum allowable value. This may prohibit network capacity crunches from draining the UE batteries in excess. This may shift the switching threshold to demand higher power savings in order to make the risk of capacity outage "worthwhile".

According to some embodiments of the invention, if the equivalent current draw of the transmit power (820) minus the equivalent current draw of the second transmit path excluding the High Power PA (840) is greater than the equivalent current draw of non-diversity operation found in 830, then the threshold range may be set a predetermined operational range of power values (860). According to another embodiment some other similar action may be taken which does not cause a threshold range to be set based on the current power, which may include not affecting a prior threshold range, setting a parameter or the like.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A method of transmitting a signal by a mobile wireless communication device, comprising:
   receiving an input signal for transmission;
   determining whether to transmit the input signal in diversity or non-diversity mode by comparing a transmit power to a high threshold transmit power and a low threshold transmit power;
   producing first and second transmit signals when the transmit power is greater than the high threshold, said first and second transmit signals differing by a transmit diversity parameter;
   simultaneously transmitting the first and second transmit signals using first and second transmit paths, respectively; and
   transmitting the input signal using only a selected one of said first and second transmit paths when the transmit power is less than the low threshold.

2. The method of claim 1, further comprising calculating a power consumption parameter.

3. The method of claim 1, wherein one of said transmit paths includes a high power amplifier and the other transmit path includes a low power amplifier.

4. The method of claim 3, wherein transmitting the input signal using only a selected one of said first and second transmit paths comprises transmitting the input signal on the transmit path including the low power amplifier.

5. The method of claim 3, wherein transmitting the input signal using only a selected one of said first and second transmit paths comprises transmitting the input signal on the transmit path including the high power amplifier.

6. The method of claim 3, wherein if the determination is to transmit the signal in non-diversity mode, then determining whether to transmit the input signal using the transmit path including the low power amplifier or the transmit path including the high power amplifier, and based on the determination, transmitting the input signal using only the selected transmit path.

7. The method of claim 3, wherein a substantially maximum efficiency of the high power amplifier substantially coincides with the specification power limit of the mobile communication device.

8. The method of claim 3, wherein a substantially maximum efficiency of the low power amplifier substantially coincides with a fraction of the specification power limit of the mobile communication device.

9. The method of claim 3, wherein a substantially maximum efficiency of the low power amplifier substantially coincides with half the specification power limit of the mobile communication device.

10. The method of claim 3, comprising:
    measuring a first current drawn by the low power amplifier; and
    measuring a second current drawn by the high power amplifier,
    wherein determining whether to transmit the input signal in diversity or non-diversity mode is based on said measured first and second currents.

11. The method of claim 1, wherein if the determination is to transmit the signal in non-diversity mode, then disabling a power amplifier associated with the non-selected one of the first and second transmit paths.

12. The method of claim 11, wherein if the determination is to transmit the signal in non-diversity mode, then disabling a phase modulator.

13. The method of claim 1, wherein if the determination is to transmit the signal in diversity mode, then enabling power amplifiers associated with the first and second transmit paths.

14. The method of claim 13, wherein if the determination is to transmit the signal in diversity mode, then enabling a phase modulator.

15. The method of claim 1, wherein said transmit diversity parameter is a phase difference between the first and second transmit signals.

16. A mobile communication device comprising:
    a phase modulator adapted and configured to receive a signal and produce first and second transmit signals differing by a transmit diversity parameter;
    a first transmit path including at least a first antenna, and a first power amplifier operable to amplify a transmit signal for transmission by the first antenna;
    a second transmit path including at least a second antenna, and a second power amplifier operable to amplify a transmit signal for transmission by the second antenna;

a processor to determine whether to transmit the input signal in diversity or non-diversity mode by comparing a transmit power to a high threshold power and a low threshold power;

wherein if the processor determines to transmit the signal in diversity mode, then said processor is to enable first and second power amplifiers and control said phase modulator to simultaneously transmit the first and second transmit signals using said first and second transmit paths, respectively; and wherein if the processor determines to transmit the signal in non-diversity mode, then said processor is to transmit the input signal using only a selected one of said first and second transmit paths.

17. The mobile communication device of claim 16, wherein said processor calculates a power consumption parameter.

18. The mobile communication device of claim 16, wherein one of said transmit paths includes a high power amplifier and the other transmit path includes a low power amplifier.

19. The mobile communication device of claim 18, wherein said processor is to transmit the input signal using only a selected one of said first and second transmit paths by transmitting the input signal on the transmit path including the low power amplifier.

20. The mobile communication device of claim 18, wherein said processor is to transmit the input signal using only a selected one of said first and second transmit paths by transmitting the input signal on the transmit path including the high power amplifier.

21. The mobile communication device of claim 18, wherein if the determination is to transmit the signal in non-diversity mode, then said processor is further to determine whether to transmit the input signal using the transmit path including the low power amplifier or the transmit path including the high power amplifier, and said processor is to transmit the input signal using only the selected transmit path based on the determination.

22. The mobile communication device of claim 18, wherein a substantially maximum efficiency of the high power amplifier substantially coincides with the specification power limit of the mobile communication device.

23. The mobile communication device of claim 18, wherein a substantially maximum efficiency of the low power amplifier substantially coincides with a fraction of the specification power limit of the mobile communication device.

24. The mobile communication device of claim 18, wherein a substantially maximum efficiency of the low power amplifier substantially coincides with half the specification power limit of the mobile communication device.

25. The mobile communication device of claim 18, wherein said processor is further to:
measure a first current drawn by the low power amplifier; and
measure a second current drawn by the high power amplifier,
wherein said processor is to determine whether to transmit the input signal in diversity or non-diversity mode based on said measured first and second currents.

26. The mobile communication device of claim 16, wherein if said processor determines to transmit the signal in non-diversity mode, then said processor is to disable the power amplifier associated with the non-selected one of the first and second transmit paths.

27. The mobile communication device of claim 26, wherein if said processor determinates to transmit the signal in non-diversity mode, then said processor is to disable the phase modulator.

28. The mobile communication device of claim 16, wherein if said processor determines to transmit the signal in diversity mode, then said processor is to enable the power amplifiers associated with the first and second transmit paths.

29. The mobile communication device of claim 28, wherein if said processor determines to transmit the signal in diversity mode, then said processor is to enable the phase modulator.

30. The mobile communication device of claim 16, wherein said transmit diversity parameter is a phase difference between the first and second transmit signals.

* * * * *